March 20, 1962  B. E. FRANKENFIELD ETAL  3,026,452
ELECTRICAL CONTROL SYSTEM
Filed March 28, 1958  9 Sheets-Sheet 5

INVENTORS
B.E. FRANKENFIELD
L.W. MALZAHN
J.R. WEIGEL
BY C.R. Hamilton
ATTORNEY

FIG. 10

INVENTORS
B. E. FRANKENFIELD
L. W. MALZAHN
J. R. WEIGEL
BY C. N. Hamilton
ATTORNEY

FIG. 11

INVENTORS
B. E. FRANKENFIELD
L. W. MALZAHN
J. R. WEIGEL
BY C. S. Hamilton
ATTORNEY

FIG. 12

INVENTORS
B. E. FRANKENFIELD
L. W. MALZAHN
J. R. WEIGEL
BY C. B. Hamilton
ATTORNEY United States Patent Office 3,026,452
Patented Mar. 20, 1962

3,026,452
ELECTRICAL CONTROL SYSTEM
Bruce E. Frankenfield, Chicago, Lester W. Malzahn, Melrose Park, and John R. Weigel, Elmhurst, Ill., assignors to Western Electric Company, Incorporated, New York, N.Y., a corporation of New York
Filed Mar. 28, 1958, Ser. No. 724,629
6 Claims. (Cl. 317—6)

This invention relates to electrical control systems and more particularly to systems for controlling the speed and tension of wire passed through wire-drawing, annealing, tinning and insulating machines connected together for tandem operation.

In the production of insulated wire, it is desirable that the wire be handled as little as possible in order to promote speed and efficiency in production. Normally, the wire must be drawn, annealed, tinned and insulated, in that order. In the past, these operations have been conducted by separate machines not connected together in any way. This has rendered it necessary to manually string the wire through each machine and has created problems in storage and handling, since the wire does not pass directly from one machine to another. With this problem in mind, one of the objects of this invention is to provide a system for maintaining predetermined differences in speeds of wire-drawing, annealing, tinning and wire take-up machines operating on a continuous wire to permit tandem operation of these machines by providing a predetermined amount of wire slippage at each machine.

Another object of this invention is to provide an electrical system for controlling a plurality of machines.

Another object of this invention is to provide a system for maintaining predetermined differences between the peripheral speeds of rotation of a plurality of capstans carrying a continuous wire.

Still another object of this invention is to provide a wire-handling system wherein a plurality of capstans carrying a continuous wire are driven at peripheral speeds greater than the speed of the wire to establish slippage between the wire and the capstans for maintaining a constant tension in the wire.

A further object of this invention is to provide a system for controlling the supply of electrical energy to magnetic clutches which connect driving motors to capstans carrying a continuous wire.

A still further object of this invention is to provide a system for adjusting a plurality of variable potentiometers to control the supply of electrical energy to a plurality of magnetic clutches which connect driving motors to capstans carrying a continuous wire.

One embodiment of the present invention for maintaining predetermined differences between the speeds of capstans in various machines utilizes "differential" selsyns for controlling the capstan speeds. The machines to be controlled are a wire-drawing machine for reducing the diameter of the wire; an annealing machine for heating and tempering the wire; and a "take-up" mechanism for feeding the wire onto storage reels, each machine having a capstan driving a continuous wire extending through all of the machines. The speed of the wire through the system is controlled by the speed of the take-up mechanism capstan. Both the wire-drawing machine and annealing machine capstans rotate at peripheral speeds greater than the speed of the wire to insure a predetermined amount of slippage between the capstans and the wire, the annealing machine capstan rotating at a peripheral speed slightly less than the peripheral speed of the wire-drawing machine capstan. These slippages between the wire and the capstans in the wire-drawing machine and annealing machine insure that the wire is properly tensioned as it travels through the machines. The differences in peripheral speeds may be accomplished by using capstans of different diameters. Thus, the angular speeds of the capstans may be equal while the peripheral speeds are different by a predetermined amount.

The capstans on the wire-drawing machine, the annealing machine and the take-up mechanism are driven through magnetic clutches by alternating current motors and have coupled thereto differential selsyn generators, each of which is electrically connected to one of several differential selsyn motors. Each of the differential selsyn motors is electrically connected between one of two differential selsyn generators coupled to the wire-drawing machine capstan and a selsyn generator coupled to the annealing machine capstan or the take-up capstan. Each differential selsyn motor is thus associated with the wire-drawing machine and one of the machines having a capstan to be controlled, i.e., the annealing machine, and the take-up mechanism.

Each differential selsyn motor is coupled to a potentiometer which regulates the flow of electrical energy through a thyratron tube to the magnetic clutch associated with the machine to be controlled. For example, considering the annealing machine; if the angular speed of the annealing machine capstan exceeds the angular speed of the wire-drawing machine capstan, the voltages applied to the differential selsyn motor by the differential selsyn generators coupled to the annealing machine capstan and the wire-drawing machine capstan are out of electrical balance and the shaft of the differential selsyn motor begins to rotate. As this shaft moves, it moves the potentiometer controlling the flow of current through the thyratron associated with the annealing machine. This varies the amount of current supplied to the magnetic clutch to cause the annealing machine capstan to be speeded up into coincidence with the wire-drawing machine capstan.

Other objects and advantages of the invention will become apparent by reference to the following detailed description and the accompanying drawings illustrating preferred embodiment of the invention, in which.

*Wire-Drawing, Annealing, Tinning and Insulating System*

Figure 1:
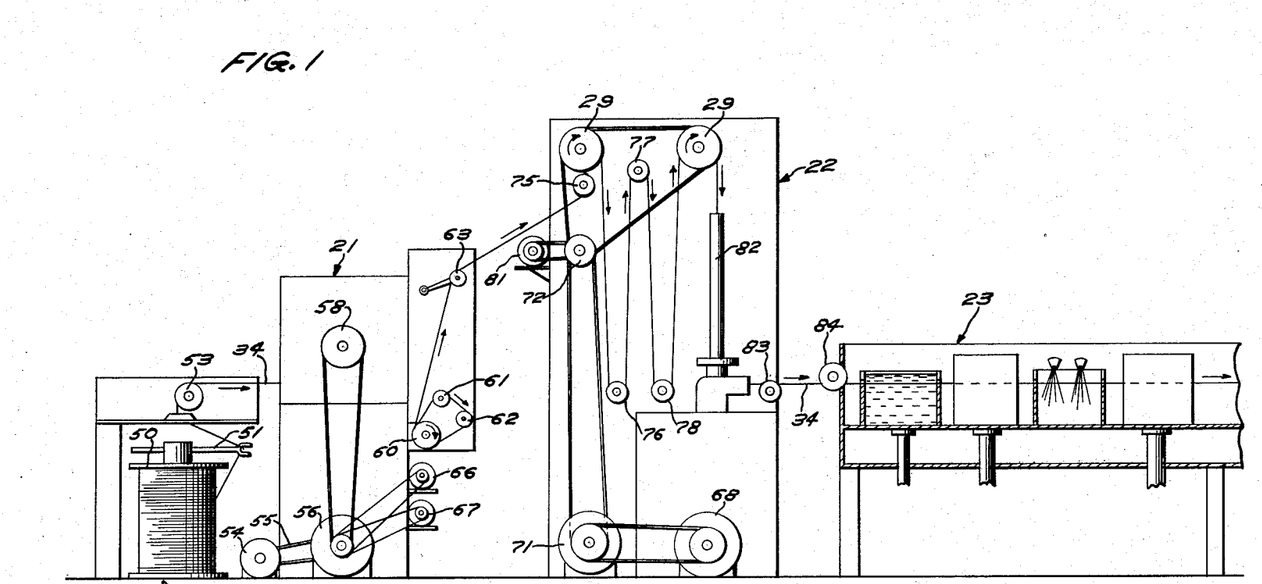
FIGS. 1–4 illustrate a wire-drawing, annealing, tinning, insulating and take-up system such as may be controlled by the present invention.
Figure 2:
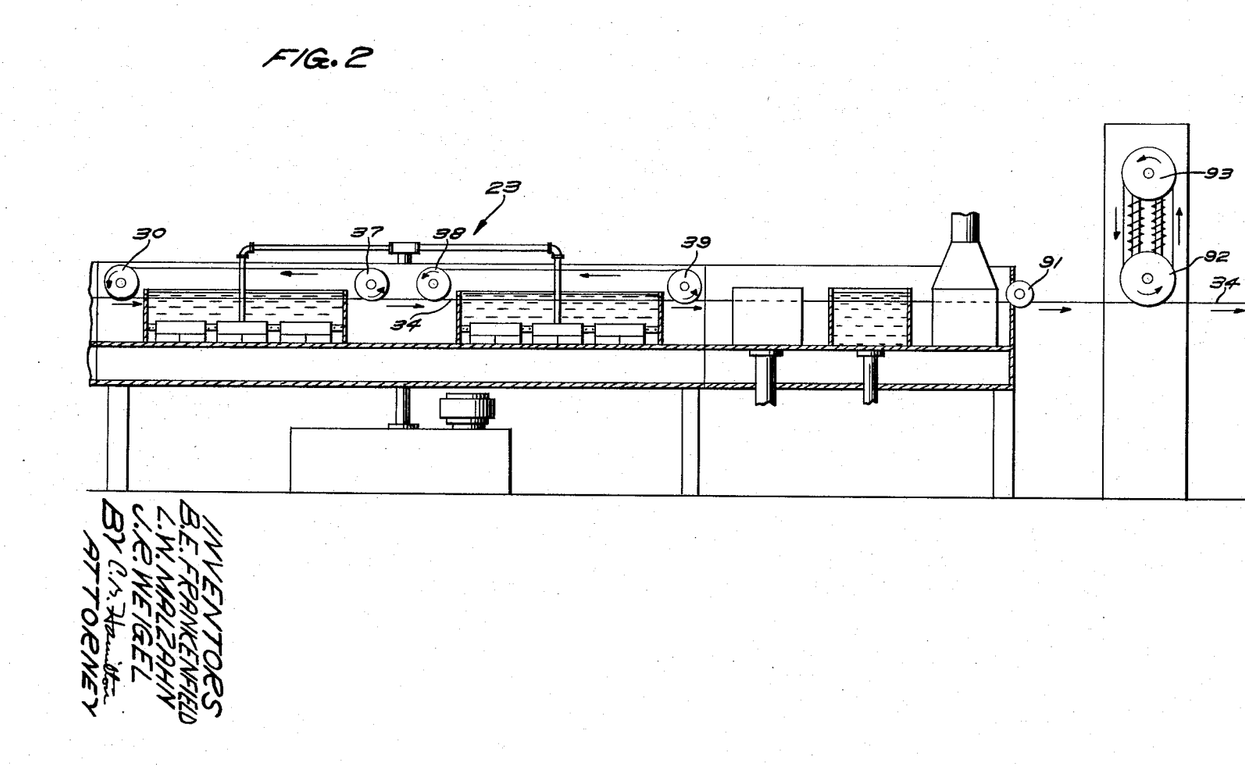

Referring now in detail to the drawings, FIGS. 1–4 show a system to be controled by the present invention. This system includes a wire-drawing machine 21 (FIG. 1); an annealing machine 22 (FIG. 1); a tinning machine 23 (which is shown in FIGS. 1 and 2 but which is not controlled by differential selsyns); and a take-up mechanism 24 (FIG. 4) having capstans 28 (not shown in FIG. 1), 29, 30 and 31, respectively, for engaging and advancing a wire 34. The capstan 31, which controls the speed of the wire 34, has a smaller diameter than the annealing machine capstans 29, which in turn have smaller diameters than does the wire-drawing machine capstan 28. Thus, when the capstans 28, 29 and 31 are driven at the same angular speed, a predetermined amount of slippage occurs at the annealing machine capstans 29, while a greater amount occurs at the wire-drawing machine capstan 28. This slippage properly tensions the wire. The present invention controls and equalizes the angular speeds of rotation of the capstans 28, 29 and 31 so that their peripheral speeds are maintained at the desired values.

The system or line-up of machines also has included therein other machines and devices which are necessary to the operation of the system but which have no wire-driving capstans and thus need not be controlled by the present invention. Some of these machines are provided with idler rolls over which the wire 34 may pass but these rolls are driven by or at the same speed of the wire and neither add to or detract from the speed of the wire.

The wire 34 to be operated on is fed from a reel 50 past a flyer 51 and a sheave 53 into the wire-drawing machine 21. A motor 54 on the wire-drawing machine 21 supplies power through a non-slip belt 55, a magnetic clutch 56, and a sheave 58 to drive the wire-drawing capstan 28 (not shown in FIG. 1 but shown in FIG. 6). The wire 34 is pulled through drawing dies (not shown) by the wire-drawing capstan 28, leaves the wire-drawing machine 21 and passes over idler sheaves 60, 61, 62 and 63 on the wire-drawing machine 21 to the annealing machine 22. Differential selsyn generators 66 and 67 on the wire-drawing machine 21 are driven from the magnetic clutch 56 by non-slip belts.

The annealing machine 22 (FIG. 1) is provided with a motor 68 which drives a magnetic clutch 71 which in turn drives capstans 29 through non-slip belts and a sheave 72. The wire 34 passes over the capstans 29 and sheaves 75, 76, 77 and 78. The sheave 78 is grounded and the sheave 75 is at an electrical potential above ground in order to pass an electrical current through the wire 34 from the sheave 75 to the sheave 78 for heating and annealing the wire. The heated wire 34 passes through and is cooled in a tube 82 which is purged with steam and then passes from the annealing machine 22 to the tinning machine 23 over idler sheaves 83 and 84. A selsyn generator 81 on the annealing machine 22 is driven from the sheave 72 by a non-slip belt.

The mechanical structure of the tinning machine 23 is disclosed in application Serial No. 688,900, filed October 8, 1957, by P. B. Banks, L. W. Myers, G. G. Stendahl and H. L. Wagner, for "Method for Electroplating Wire," and now abandoned. The wire 34 passes over and around tinning machine capstans 30, 37, 38 and 39 as best illustrated in FIG. 2. The capstans 30, 37, 38 and 39 are driven by "soft-torque" direct current motors 329, 332, 333 and 334 (FIG. 9) which merely apply enough driving force to overcome the friction in the bearings of the capstans 30, 37, 38 and 39 whereby these capstans impart no driving force to the wire 34.

The wire 34 then passes over idler sheaves 91, 92 and 93 (FIG. 2), and 95, 96 and 97 (FIG. 3), the sheaves 96 and 97 being mounted on a preheater unit 100. The sheave 97 is grounded and an electrical potential is applied to the sheave 96 to force an electrical current through the wire 34 between the sheaves 96 and 97 for heating the wire before insulation is extruded thereonto by an extruding machine 101 of a well-known type. The extruding machine 101 is provided with a screw (not shown) which is driven by a motor 102 for extruding a layer of insulation onto the wire 34.

The insulated wire then passes through a color coding unit 105 of a well-known type which applies a predetermined patern of ink of a predetermined color to the insulated wire to provide a means for later identifying the wire. The color-coded wire 34 is dried by an oven 106 and is then passed through a commercialy available unit 110 of a well-known type which means the capacitance of the wire, this measurement being indicative of the thickness of the layer of insulation on the wire.

After leaving the capacitance measuring 110, the insulated and color-coded wire 34 passes through an insulation testing device 111 (FIGS. 3 and 4) of a well-known, commercially available type which measures the thickness of the wire 34 to determine whether the layer of insulation is of a proper thickness. Such a device is the "Diameter Gauge" sold by Industrial Gauges Corporation.

Figure 4:
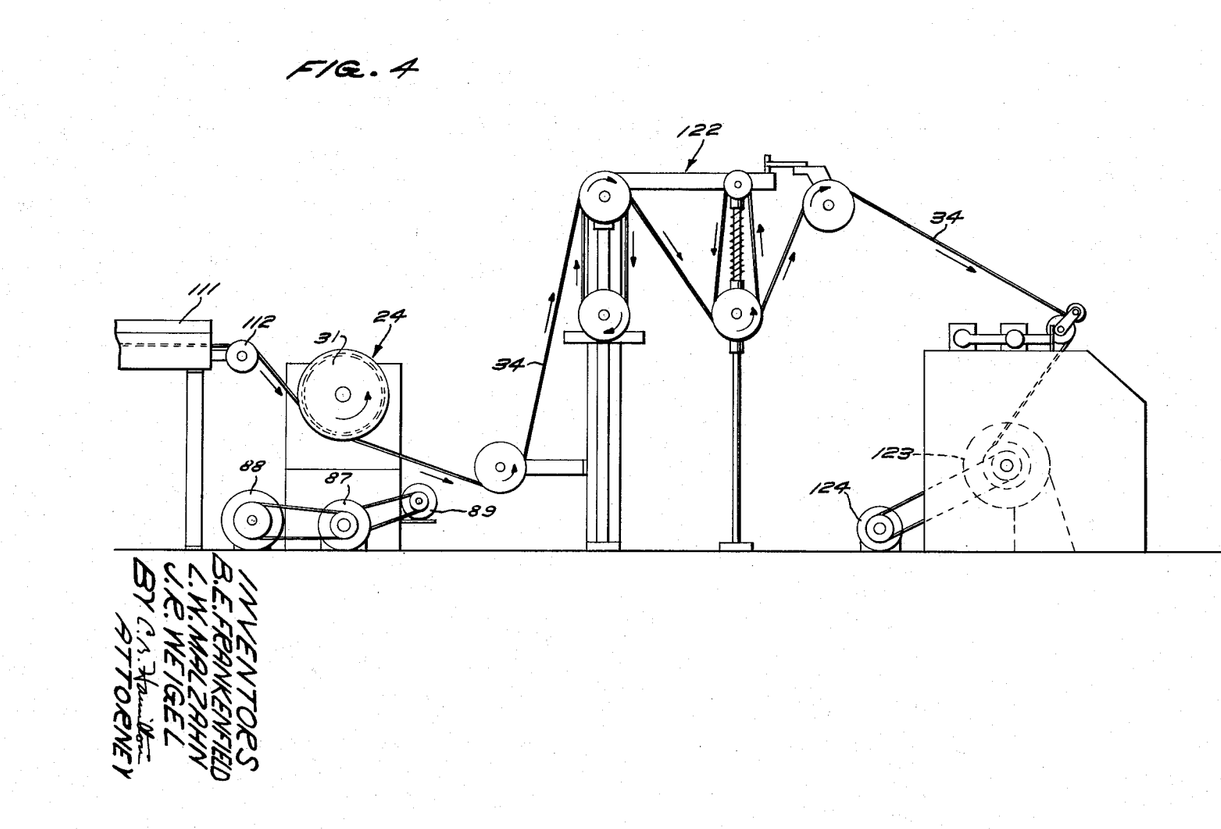
Figure 5:
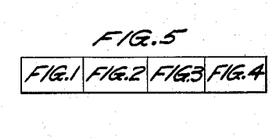
FIG. 5 shows the manner in which FIGS. 1–4 should be connected for a composite illustration of the system.

The wire 34 passes from the thickness testing device 111 over an idler sheave 112 and makes several turns around the take-up capstan 31 as shown in FIG. 4. The take-up capstan 31 is driven by a motor 88 through non-slip belts and a magnetic clutch 87. A selsyn generator 89 on the takeup mechanism is driven by a non-slip belt from the output of the magnetic clutch 87.

The wire 34 leaving the take-up capstan 31 passes through an accumulator 122 and is wound onto a reel 123 driven by a motor 124. The accumulator 122 and the reel 123 with its asociated mechanism is disclosed in a co-pending application Serial No. 642,508, filed February 26, 1957, by J. N. Detrick, C. R. Hoffman and L. W. Malzahn for "Continuous Wire Winding Apparatus," and now Patent No. 2,929,569.

Wire-Drawing Magnetic Clutch Control Unit

Figures 6, 8:
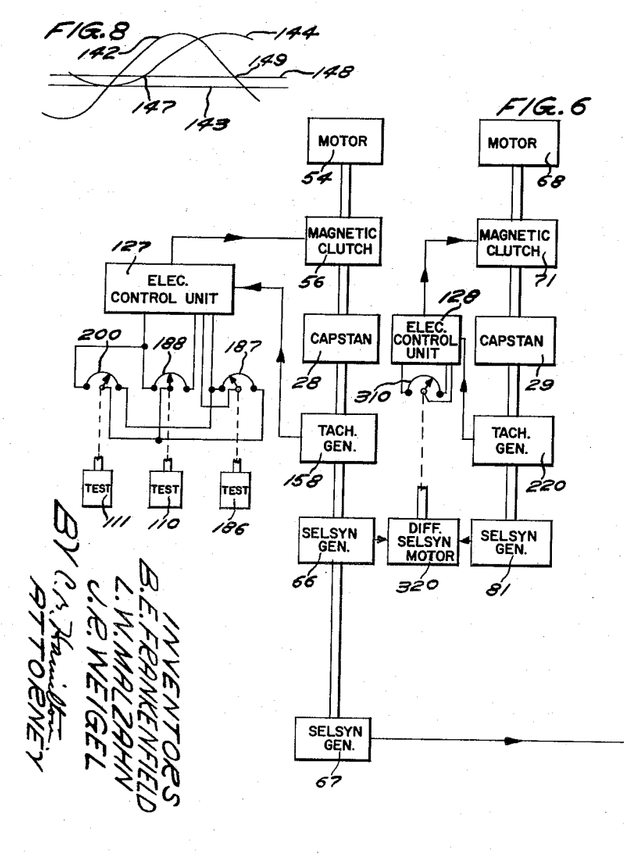
FIG. 6 is a block diagram of an electrical system for controlling the machines illustrated in FIGS. 1–4.
FIG. 8 depicts substantially the same voltages shown in FIG. 7 with the exception that the voltages applied to grids of the thyratron tubes are altered in FIG. 8 to illustrate the manner in which conduction of the thyratron tubes is controlled.
Figure 11:
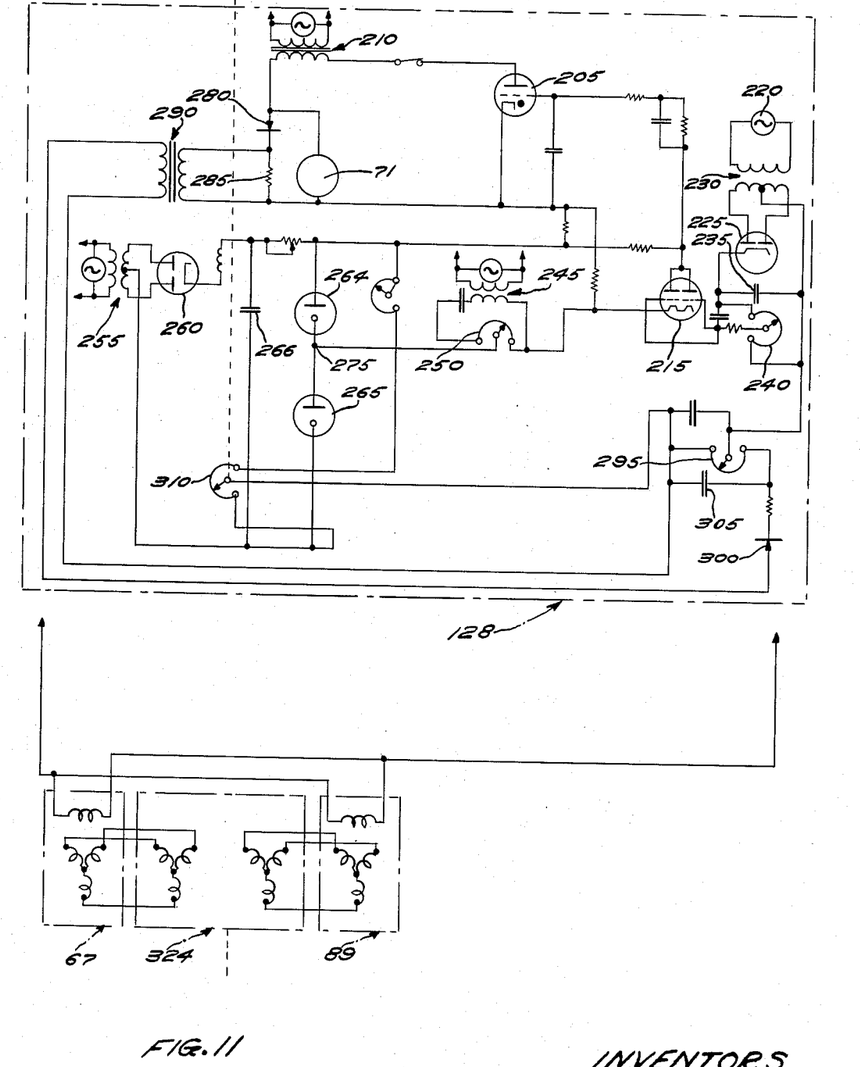
Figure 12:
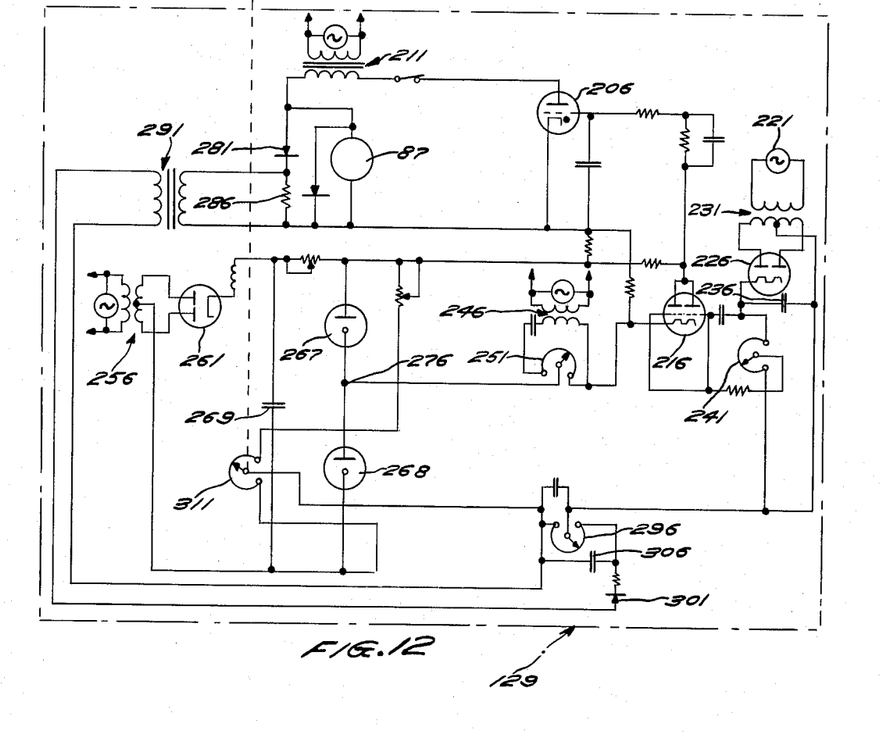
Figure 13:
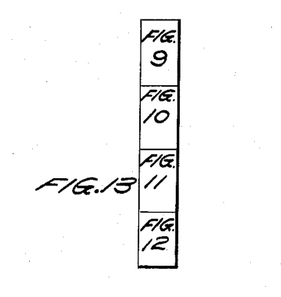
FIG. 13 is a diagram showing the relationship of FIGS. 9–12 to each other.

The wire-drawing capstan 28 is driven by the motor 54 acting through the magnetic clutch 56 (shown diagrammatically in FIG. 6). The magnetic clutch 56 is operated by an electronic control unit 127, of a commercially available type, illustrated in detail in FIG. 10. Each of the clutches 71 and 87 are driven by control units 128 and 129, respectively, which are substantially the same as that illustrated in FIG. 10 and which are shown in FIGS. 11 and 12, respectively. The operation of the wire-drawing control unit 127 is substantially identical to the operation of the other control units.

Figure 7:
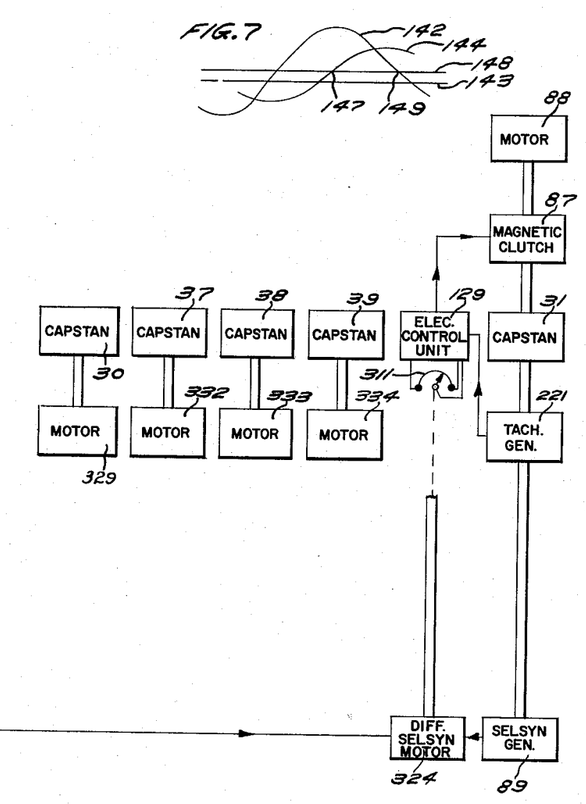
FIG. 7 depicts typical voltages which are applied to a thyratron tube to control its periods of conduction.

Current to operate the magnetic clutch 56 is passed through a thyratron tube 141, the conduction of which is directly or indirectly controlled by four voltages, an alternating current voltage applied to the plate of the thyratron 141, a negative direct current "governed" voltage applied to the grid of a tube 164, a direct current "reference" voltage applied to the cathode of the tube 164, and an alternating current "rider" voltage applied to the cathode of the tube 164 90° out of phase with the alternating current voltage applied to the plate of the tube 141. The tube 164 mixes or combines these voltages and applies the resulting biasing voltage to the grid of the thyratron 141. The aforementioned voltages, with the exception of the reference voltage, are illustrated in FIGS. 7 and 8.

The tube 141 can conduct only when the alternating current plate voltage designated by the numeral 142 (FIGS. 7 and 8) is positive and the biasing voltage resulting from the combined direct current governed voltage designated by the numeral 144, direct current reference voltage, and the alternating current rider voltage identified by the numeral 144 exceeds the cut-off voltage of the tube 141. Assume that the tube 164 supplies a biasing voltage which varies in direct proportion to its grid and cathode voltages so that these voltages in effect are applied to the grid of the tube 141 and also assume that the tube 141 conducts only when its grid voltage, represented by line 148, is zero or above (the plate voltage, of course, must be positive). The tube 141 will then begin conduction at a pont 147 (FIG. 7) where the combined voltage 144 and the reference voltage exceed the cut-off voltage, and will continue to conduct until the plate voltage 142 goes negative at a point 149. Thus, current will be passed to the clutch 56 during the time interval represented by the distance between points 147 and 149. From this it will be apparent that the time interval of conduction of the tube 141 can be increased by making the direct current voltage 144 more positive as depicted in FIG. 8, where the tube 141 conducts throughout the positive cycle of the alternating current plate voltage 142. Conversely, the time interval of conduction of the tube 141 can be decreased by making the direct current voltage 144 more negative.

The direct current biasing voltage is applied to the grid of the tube 141 to vary the position of the point where the combined voltages 144 render the tube conductive. By adjusting the biasing voltage, the time interval of conduction of the tube 141 can be limited to a maximum or minimum amount, since this voltage in effect determines the cut-off point of the tube.

Figure 10:
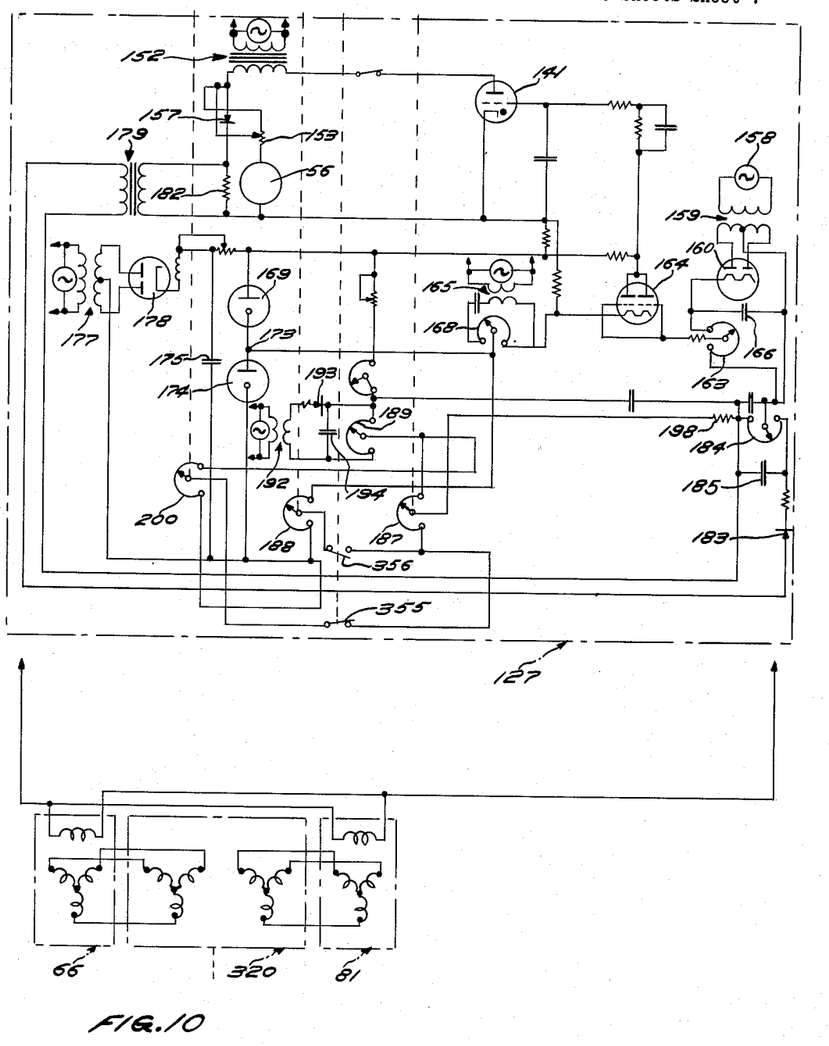

The alternating current plate voltage 142 is applied to the tube 141 from the secondary winding of a transformer 152 (FIG. 10). When the tube 141 conducts, current is passed through a variable resistor 153 and the clutch 56. When the tube 141 cuts off, the clutch 56, having therein a highly inductive coil, causes a transient current to flow through a diode 157, a resistor 182 and the clutch coil. Thus, the current through the clutch 56 does not stop abruptly as the tube 141 is cut off, but is smoothed by the transient current.

The negative governed voltage 143 is derived from a tachometer generator 158 which is connected to and rotated with the wire-drawing capstan 28 (FIGS. 6 and 10). The tachometer generator voltage is applied to a full wave rectifier 160 through a transformer 159 and the resulting D.C. potential is applied to a "biasing" potentiometer 163. The contactor of the biasing potentiometer 163 applies the governed voltage 144 to a control grid of the mixing tube 164, which, when conductive, supplies a biasing voltage to the grid of the tube 141.

This governed voltage is thus determined by the speed of the wire-drawing capstan 28, since the output of the tachometer generator 158 is proportional to the speed of the capstan 28. It then follows that an increase in the speed of the wire-drawing capstan 28 results in an increased negative governed voltage applied to the grid of the tube 141, which decreases conduction of the tube 141 to decrease the current applied to the clutch 56. The decrease in current supplied to the clutch 56 causes the speed of the capstan 28 to drop, which in turn causes the output of the tachometer generator 158 to drop. The drop in the output voltage of the tachometer generator 158 causes the governed voltage 144 applied to the grid of the tube 141 to become less negative, thereby causing more current to flow through the clutch 56. In this manner, the speed of the wire-drawing capstan 28 is regulated and adjusted to maintain it at a predetermined value. A capacitor 166 connected across the biasing potentiometer 163 evens out and eliminates fluctuations in the voltage applied to this potentiometer.

A plate voltage supply including a transformer 177 and a rectifier tube 178 is connected to the plate of the mixing tube 164 for controlling the conduction thereof. A pair of voltage regulator tubes 169 and 174 and a capacitor 175 connected across the power supply are provided for smoothing the voltage applied to the plate of the tube 164.

The alternating current "rider" voltage 144 is derived from a transformer 165 which applies an alternating current voltage to a "reference" potentiometer 168. One end of the reference potentiometer 168 is connected to the cathode of the tube 164 for applying the alternating current rider voltage to this cathode.

The "reference" voltage is taken from a junction point 173 between the voltage regulator tubes 169 and 174 and is applied to the cathode of the mixing tube 164 through the contactor of and a portion of the reference potentiometer 168. The reference voltage can be varied by adjusting the position of the contactor of the potentiometer 168.

A regulating or feedback voltage is applied to that portion of the circuit which provides the governed voltage for the purpose of effecting smoother circuit operation. A transformer 179 is connected across the resistor 182 through which the transient current induced by the coil of the clutch 56 flows. The transient current flowing through the resistor 182 causes the transformer 179 to apply a voltage through a diode 183 to a "regulation" potentiometer 184. A capacitor 185 connected across the potentiometer 184 serves to even out this voltage to thus insure that the voltage across the potentiometer 184 is constant. The contactor of the potentiometer 184 is connected to one side of the biasing potentiometer 163 for applying a portion of this regulating or feedback voltage to the control grid of the tube 164, which in turn affects the conduction of the thyratron tube 141. In this manner any effects which the transient clutch coil current may have on the operation of the clutch are compensated for by the variations in conduction of the thyratron tube 141 effected by the regulating or feedback voltage.

One side of a "pilot" potentiometer 187 is connected to the contactor of a potentiometer 189. The potentiometer 189 has connected thereacross a direct current voltage supply including a transformer 192, a diode 193 and a capacitor 194. The other side of the pilot potentiometer 187 may be connected either to the contactor of a "capacitance control" potentiometer 188, which is connected across the voltage regulator tube 174, or to the contactor of a "diameter control" potentiometer 200 connected between a center tap of the transformer 177 and the contactor of the potentiometer 189. The voltage across the pilot potentiometer 187 will thus depend upon the settings of the contactors of the potentiometer 189 and either the capacitance control potentiometer 188 or the diameter control potentiometer 200.

The contactor of the pilot potentiometer 187 is connected through a resistor 198 to one side of the "regulation" potentiometer 184 for applying a voltage thereto. This applied voltage affects the potential of the contactor of the biasing potentiometer 163 which in turn affects the conduction of the tubes 164 and 141. Thus, by moving the contactor of the pilot potentiometer 187, the conduction of the tube 141 is varied to adjust the operation of the magnetic clutch 56. In starting the control unit, the pilot contactor is slowly moved from the negative side to the positive side of the pilot potentiometer by a "pilot" motor 186 of a well-known type (FIGS. 6 and 9) to slowly increase the conduction of the tube 141 for bringing the capstan 28 up to a desirable operating speed.

When the capstan 28 is at the desired operating speed, it may be desirable to further vary the speed slightly since the layer of insulation extruded onto the wire 34 may be too thick or too thin. The thickness of the insulation is measured either by the capacitance measuring unit 110 or the diameter measuring unit 111. If the layer of insulation is too thick, the speed of the wire should be increased. Conversely, if the layer of insulation is too thin, the speed of the wire should be decreased.

When the thickness or diameter of the wire is measured by the unit 111 (shown in FIGS. 3 and 4 and also illustrated diagrammatically in FIGS. 6 and 9) a servomechanism (not shown) in this unit moves the contactor of the "diameter control" potentiometer 200 to change the potential across the pilot potentiometer 187, thereby causing a voltage change across the regulation potentiometer 184. This in turn affects the conduction of tubes 164 and 141 to affect the operation of the clutch. In this manner the diameter of the insulated wire has an effect on the speed of the wire.

Figure 3:
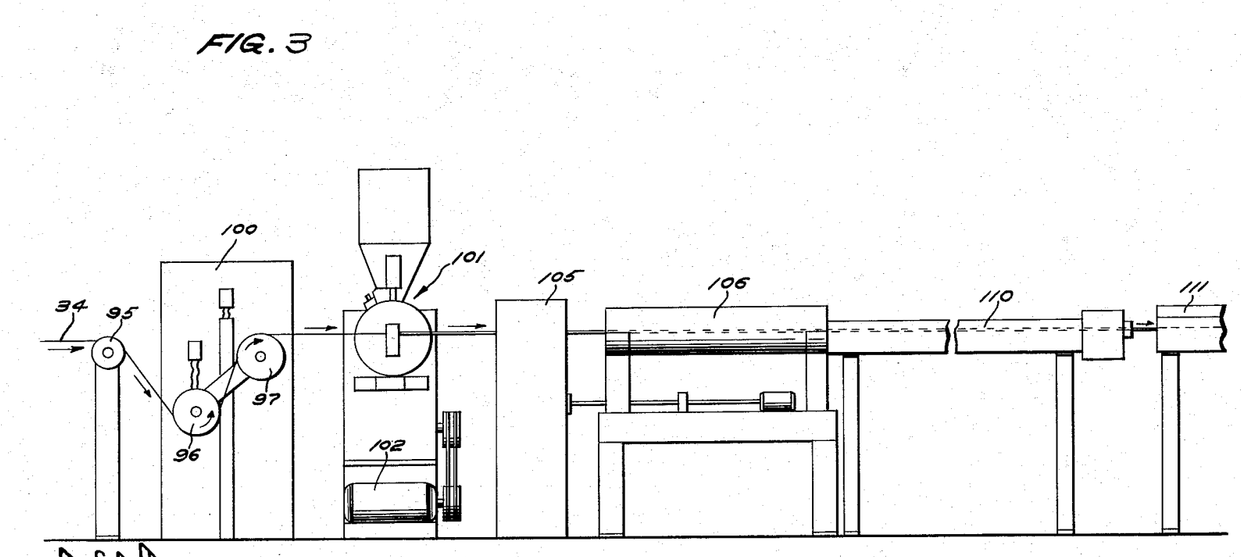
Figure 9:
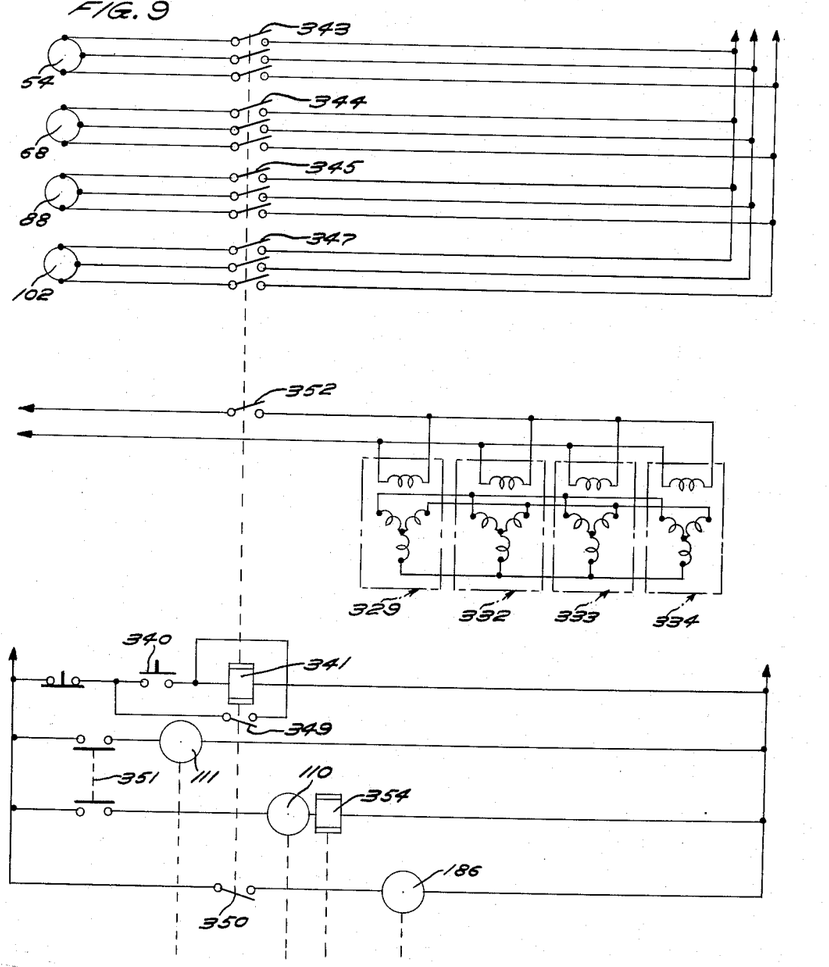
FIGS. 9–12 are circuit diagrams depicting a preferred embodiment of the control circuit for the arrangement of machines shown in FIGS. 1–4.

The contactor of the "capacitance control" potentiometer 188 is connected to and operated by the commercially available capacitance measuring unit 110 (FIGS. 3, 6 and 9). This unit 110 measures the capacitance of the moving insulated wire (which represents the thickness of the insulation) and, if the capacitance is too high or too low, moves the contactor on the capacitance control potentiometer 188 to adjust the speed of the wire 34, this adjustment being brought about by voltage changes which are set up across the pilot potentiometer 187, the regulation potentiometer 184, the potentiometer 163 and the screen grid of the tube 164. In operation, the capacitance measuring unit 110 and the diameter measuring unit 111 are not used concurrently but are used in the alternative.

In summation, the voltages applied to the control grid and cathode of the duo-triode 164 affect the conduction of this tube and indirectly control the conduction of the thyratron tube 141 which controls the magnetic clutch 56. Three basic voltages, the direct current governed voltage, the direct current reference voltage and the alternating current rider voltage control the conduction of the tube 164. The combined reference voltage and governed voltage are in turn varied slightly by adjustment of the pilot potentiometer 187 and either the capacitance control potentiometer 188 or the diameter control potentiometer 200 to further control the clutch 56.

The electronic control units associated with the annealing machine 22 and the take-up mechanism 24 are not provided with a pilot potentiometer, a capacitance control potentiometer or a diameter control potentiometer since the speed of each of these machines is determined by the speed of the wire-drawing machine and such potentiometers are thus not necessary.

*Annealing and Take-Up Magnetic Clutch Control Units*

The magnetic clutch control units 128 and 129 (FIGS. 6, 11 and 12) for the annealing machine 22 and the take-up mechanism 24, respectively, are identical in circuitry and mode of operation. Consequently, both may be described and explained simultaneously. The operation of each of these control units is substantially the same as the operation of the wire-drawing control unit 127.

The clutches 71 and 87 receive operating current from thyratron tubes 205 and 206 to which alternating current plate voltages are supplied by transformers 210 and 211, respectively. The periods of conduction of the thyratron tubes 205 and 206 are controlled by tubes 215 and 216 which are in turn controlled by direct current governed voltages applied to the grids thereof and alternating current rider voltages and direct current reference voltages applied to the cathodes thereof. These voltages control the tubes 215 and 216 in the same manner that the tube 164 is controlled.

The direct current governed voltages are derived from tachometer generators 220 and 221 connected to and driven with the annealing machine and take-up capstans 29, 31, respectively. The tachometer generator voltages are rectified by rectifier tubes 225 and 226 and transformers 230 and 231 and are smoothed by capacitors 235 and 236. The smoothed governed voltages appear across biasing potentiometers 240 and 241 having contactors connected to control grids of the tubes 215 and 216, respectively. This applies negative voltages to the grids of the tubes 215 and 216 to affect their conduction whereby conduction of the thyratron tubes 205 and 206 is also affected. Since the output voltages of the tachometer generators 220 and 221 are proportional to the speeds of the capstans 29 and 31, respectively, the conduction of the thyratron tubes 205 and 206 will vary with the speeds of the capstans 29 and 31 and, consequently, the operation of the clutches 71 and 87 will be varied with the speeds of the capstans 29 and 31 to maintain these capstans at a constant angular speed.

The rider voltages are formed by transformers 245 and 246 connected across variable "reference" potentiometers 250 and 251 connected to the cathodes of the tubes 215 and 216, respectively, which potentiometers apply the alternating current rider voltages thereto.

Direct current plate voltages are supplied to the tubes 215 and 216 by power supplies including transformers 255 and 256 and rectifiers 260 and 261 connected to the plates of the tubes 215 and 216, respectively. Each of the plate power supplies has connected thereacross pairs of voltage regulator tubes 264 and 265 and 267 and 268, and capacitors 266 and 269 for smoothing the plate voltages.

The contactors of the reference potentiometers 250 and 251 are connected to junction points 275 and 276 between the voltage regulator tubes 264 and 265, and 267 and 268, respectively, for supplying reference voltages through portions of the potentiometers 250 and 251 to the cathodes of the tubes 215 and 216. These reference voltages affect the operation of the thyratron tubes 205 and 206 in the same manner that the reference voltage affects the operation of the thyratron tube 141.

The clutches 71 and 87 have connected thereto diodes 280 and 281 and resistors 285 and 286 through which transient currents induced by the clutch coils flow when the tubes 205 and 206 are cut off. Transformers 290 and 291 respond to the changes in voltages across the resistors 285 and 286 to produce voltages which are applied to "regulation" potentiometers 295 and 296 after being rectified by diodes 300 and 301 and smoothed by capacitors 305 and 306, respectively. Contactors of the regulation potentiometers 295 and 296 are connected to the potentiometers 240 and 241 whereby voltage changes across the regulation potentiometers 295 and 296, effected by the clutch coil transient currents, are fed through the potentiometers 240 and 241 to the tubes 215 and 216. This in turn affects the conduction of the tubes 205 and 206 and the operation of the clutches 71 and 87. In this manner, transient currents induced in the clutch coils are compensated for by the variations in operation of the tubes 205 and 206 brought about by the feedback or regulation voltages which appear across the regulation potentiometers 295 and 296.

The magnetic clutch control units 128 and 129 are provide with "speed" potentiometers 310 and 311 connected across the plate power supplies. Contactors of the speed potentiometers 310 and 311 are connected to the regulation potentiometers 295 and 296 for applying "speed control" voltages thereto. When the contactors of the speed potentiometers 310 and 311 are moved, the voltages on the contactors of the regulation potentiometers 295 and 296 are changed, which results in changed voltages on the contactors of the potentiometers 240 and 241 which further results in changes in the operation of the tubes 215 and 216. The changes in operation of the tubes affect the operation of the thyratron tubes 205 and 206 to consequently vary the operation of the magnetic clutches 71 and 87. Thus, the velocities of the capstans 29 and 31 are controlled by the potentiometers 310 and 311, respectively, and may be varied by adjusting these potentiometers.

*Differential Selsyn System*

The wire-drawing machine 21 has associated therewith the two selsyn generators 66 and 67 which are driven with the capstan 28 and which may be referred to as the first wire-drawing selsyn generator 66 and the second wire-drawing selsyn generator 67.

The first wire-drawing selsyn generator 66 and the annealing machine selsyn generator 81 have connected therebetween a first differential selsyn motor 320 which has a drive shaft connected to the speed contactor of the speed potentiometer 310 in the control unit 128 (FIG. 6). When the annealing machine capstan 29 is rotating at an angular velocity equal to the angular velocity of the wire-drawing capstan 28, the inputs to the first selsyn motor 320 from the first wire-drawing selsyn generator 66 and the annealing machine selsyn generator 81 balance each other electrically and the shaft of the first selsyn motor 320 remains stationary.

However, if the angular velocity of the annealing machine capstan 29 varies from the angular velocity of the wire-drawing capstan 28, the inputs to the first selsyn motor 320 are not electrically balanced and the shaft of this selsyn motor is rotated to move the contactor of the annealing machine speed potentiometer 310, which, through the control unit 128, increases or decreases the angular velocity of the annealing machine capstan 29 to bring it into coincidence with the wire-drawing capstan 28. In this manner the annealing machine capstan 29 is maintained at a velocity of rotation equal to velocity of rotation of the wire-drawing capstan 28.

The second wire-drawing selsyn generator 67 and the take-up selsyn generator 89 have connected therebetween a second differential selsyn motor 324 having a drive shaft connected to the contactor of the take-up speed potentiometer 311 in the control unit 129 (FIG. 6). If the angular velocity of the take-up capstan 31 varies from the angular velocity of the wire-drawing capstan 28, the inputs to the third differential selsyn motor 324 will be electrically unbalanced and the shaft of this motor will rotate to move the contactor of the speed potentiometer 311. Movement of the contactor of the speed potentiometer 311 affects the control unit 129 which in turn regulates the operation of the magnetic clutch 87 to bring the angular velocity of the capstan 31 into coincidence with the velocity of the wire-drawing capstan 28.

General Control Circuit

A start switch 340 (FIG. 9) is manually closed to apply power to a solenoid 341 which simultaneously closes sets of contactors 343, 344, 345 and 347 and contactors 349, 350 and 352. The closing of the sets of contactors 343, 344, 345 and 347 applies power to the wire-drawing machine motor 54, the annealing machine motor 68, the take-up mechanism motor 88 and the extruder motor 102, respectively. The closing of the contactor 349 establishes a locking circuit which holds in the solenoid 341 after the start switch 340 is released. The closing of the contactor 350 applies power to the pilot motor 186 to cause it to operate the contactor of the pilot potentiometer 187 to bring the system up to a predetermined desirable speed. The closing of the contactor 352 applies power to the "soft-torque" direct current motors 329, 332, 333 and 334 in the tinning machine 23.

A manually operated switch 351 may be moved to apply power either to the wire diameter measuring unit 111 or the capacitance measuring unit 110, but not to both. The capacitance measuring unit 110 has connected to it a solenoid 354 which, when energized, opens a contactor 355 and closes a contactor 356. The opening of the contactor 355 disconnects the contactor of the diameter control potentiometer 200 from the pilot potentiometer 187, while the closing of the contactor 356 connects the contactor of the capacitance control potentiometer 188 to the pilot potentiometer 187. Thus, when the capacitance measuring unit 110 is connected to power and in operation, the capacitance control potentiometer 187 ultimately controls the velocity of the wire-drawing capstan 28 (and, of course, the capstans 29 and 31), and, when the diameter measuring unit 111 is connected to the power supply the diameter control potentiometer 200 controls the angular velocities of the capstans 28, 29 and 30.

Summary of Operation

The start switch 340 is manually closed to apply power to the motors 54, 68, 88 and 102 driving the wire-drawing capstan 28, the annealing machine capstan 29, the take-up capstan 31 and the extruder 101, respectively. The closing of the switch 340 also applies power to the motors 329, 332, 333 and 334, as well as to the pilot motor 186. Power is also applied to either the wire diameter measuring unit 111 or the wire capacitance measuring unit 110, depending upon the position of the switch 351. For purposes of illustration, assume that the position of the switch 351 is such that power is applied to the diameter measuring unit 111. Switches (not shown) are manually closed to apply power to the control units 127, 128 and 129.

When power is applied to the pilot motor 186, it slowly moves the contactor of the pilot potentiometer 187 to apply an increasing voltage to the regulation potentiometer 184 in the control unit 127. The increasing voltage on the potentiometer 184 increases the voltage across the biasing potentiometer 163 which in turn increases the voltage applied to the grid of the mixing tube 164. This results in a gradual increase in the biasing voltage applied by the tube 164 to the thyratron tube 141 controlling the magnetic clutch 56, thereby increasing the speed of the capstan 28 by increasing the conduction of the tube 141 in the manner described above. In this manner, the speed of the capstan 28 is gradually increased from a minimum speed to a desired operating speed.

As the capstan 28 is brought up to the desired operating speed, the angular speeds of the capstans 29 and 31 must also be increased. Since the capstans 29 and 31 are controlled by identical circuitry, a description of the manner in which the speed of the capstan 29 is increased will suffice to explain both.

As the angular speed of the capstan 28 is increased above the angular speed of the capstan 29, the electrical inputs from the first wire-drawing selsyn generator 66 and the annealing machine selsyn generator 81 to the first selsyn motor 320 will be out of balance, thereby causing the selsyn motor 320 to move the contactor of the speed potentiometer 310 in the control unit 128. Movement of the contactor of the speed potentiometer 310 effects an increase of the angular speed of the capstan 29 as above-described. When the angular speeds of the capstans 28 and 29 become equal, the inputs to the selsyn motor 320 are equal and the contactor of the speed potentiometer 310 is not again moved until these speeds differ. The angular speed of the capstan is increased and stabilized with the angular speed of the capstan 28 in the same manner as is the capstan 29.

After the capstans 28, 29 and 31 are at operating speed, it may be desirable to alter this speed slightly, depending upon whether the layer of insulation extruded onto the wire is of a desirable thickness. If the layer of insulation is too thick or too thin, the diameter measuring unit 111 (which has been assumed to be connected to power) is actuated to operate the contactor of the potentiometer 200 in the control unit 128. Movement of this contactor changes the speed of the capstan 28 by causing changes in the voltages across the potentiometers 187, 184 and 163 and a consequent change in the conduction of the tubes 164 and 141. The change in conduction of the tube 141 will, of course, change the amount of electrical energy passed to the clutch 56 to adjust the speed of the capstan 28. The angular speeds of the capstans 29 and 31 are equalized with the adjusted angular speed of the wire-drawing capstan 28 in the manner described above.

It is to be understood that the above-described arrangements are simply illustrative of the application of the principles of the invention. Numerous other arrangements may be readily devised by those skilled in the art which will embody the principles of this invention and fall within the spirit and scope thereof.

What is claimed is:

1. A system for adjusting the speed of a second machine into synchronization with the speed of a first machine, comprising driving means, an electrically operated clutch connecting the driving means to the second machine, power supply means, an electron tube for passing electrical energy from the power supply means to operate the clutch, circuit means for supplying a biasing voltage to the tube to vary the rate at which electrical energy is passed to the clutch, potentiometer means in the circuit means for varying said basing voltage, and means responsive to differences in the speeds of the machines for adjusting the potentiometer means to vary said biasing voltage.

2. In a system for synchronizing the speeds of a pair of machines, a pair of drive motors, a pair of electrically operated clutches connecting the drive motors to the machines, a pair of electron tubes for passing electrical energy to the clutches, power supply means connected to the tubes, circuit means for biasing the tubes to vary the amount of electrical energy passed to the clutches, and means responsive to differences in the speeds of said pair of machines for controlling the circuit means to vary the biasing voltage applied to one of the tubes for adjusting the speed of the machine associated with said one tube.

3. A system for equalizing the angular speed of a second capstan with a first capstan, comprising means for driving the first capstan, a drive motor, an electrically operated clutch interconnecting the drive motor and the second capstan, power supply means, a first electron tube connected between the power supply means and the clutch for passing electrical energy from said power supply to said clutch, a second electron tube connected to a grid of the first electron tube for controlling the condution of said first tube, means for supplying an alternating current voltage to the second tube, means for supplying a direct current voltage to the second tube, and means responsive to differences in angular speeds of the capstans for varying said direct current voltage.

4. A system for equalizing the angular speed of a second capstan with the angular speed of a first capstan, comprising means for driving the first capstan, a drive motor, an electrically operated clutch connecting the drive motor to the second capstan, power supply means, an electron tube connected to the power supply means and the clutch for passing electrical energy from said power supply means to said clutch, circuit means for supplying a biasing voltage to the tube to vary the rate at which electrical energy is passed to the clutch, potentiometer means in the circuit means for varying said biasing voltage, a first selsyn generator connected to and driven with the first capstan, a second selsyn generator connected to and driven with the second capstan, a differential selsyn motor connected between said first and second selsyn generators and having a drive shaft connected to the potentiometer means for adjusting said potentiometer means to vary the biasing voltage when the speed of the second selsyn generator varies from the speed of the first selsyn generator.

5. A system for equalizing the angular speeds of a plurality of capstans, comprising a first capstan, first drive means for rotating the first capstan, a second capstan, second drive means for rotating the second capstan, an electrically operated clutch interconnecting the second drive means and the second capstan, power supply means associated with the second capstan, an electron tube associated with the second capstan for transmitting electrical energy from the power supply means associated with the second capstan to the clutch interconnecting the second drive means and the second capstan, potentiometer means associated with the second capstan for controlling the conduction of the electron tube associated with the second capstan to control the operation of the clutch associated with the second capstan, means responsive to differences in angular speeds of the first and second capstans for adjusting the potentiometer means associated with the second capstan to equalize the angular speed of the second capstan with the angular speed of the first capstan, a third capstan, third drive means for rotating the third capstan, an electrically operated clutch interconnecting the third drive means and the third capstan, a power supply associated with the third capstan, an electron tube associated with the third capstan for transmitting electrical energy from the power supply associated with the third capstan to the clutch associated with said third capstan, potentiometer means associated with the third capstan for controlling the conduction of the electron tube associated with the third capstan to control the operation of the clutch associated with the third capstan, and means responsive to differences in angular speeds of the first and third capstans for adjusting the potentiometer means associated with the third capstan to equalize the angular speed of the third capstan with the angular speed of the first capstan.

6. A system for maintaining a predetermined relationship between the angular velocities of a pair of rotary elements which comprises drive means, an electrically operated clutch connecting the drive means to one of the elements, power supply means, a control circuit for passing electrical energy from said power supply means to operate said clutch, potentiometer means cooperatively connected within said control circuit for varying the rate at which electrical energy is passed to the clutch, and means responsive to differences between the angular velocities of the rotary elements for adjusting said potentiometer means.

References Cited in the file of this patent

UNITED STATES PATENTS

| | | |
|---|---|---|
| 2,325,190 | McElhinney | July 27, 1943 |
| 2,447,208 | Rendel | Aug. 17, 1948 |
| 2,759,115 | Seney | Aug. 14, 1956 |
| 2,817,028 | Winther | Dec. 17, 1957 |